(12) United States Patent
Nakano et al.

(10) Patent No.: US 11,674,604 B2
(45) Date of Patent: Jun. 13, 2023

(54) DIAPHRAGM AND FLUID DEVICE

(71) Applicant: NIPPON PILLAR PACKING CO., LTD., Osaka (JP)

(72) Inventors: Atsushi Nakano, Osaka (JP); Kazukiyo Teshima, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 50 days.

(21) Appl. No.: 17/603,410

(22) PCT Filed: Jan. 10, 2020

(86) PCT No.: PCT/JP2020/000633
§ 371 (c)(1),
(2) Date: Oct. 13, 2021

(87) PCT Pub. No.: WO2020/213217
PCT Pub. Date: Oct. 22, 2020

(65) Prior Publication Data
US 2022/0213964 A1  Jul. 7, 2022

(30) Foreign Application Priority Data

Apr. 15, 2019  (JP) .............................. JP2019-076920

(51) Int. Cl.
*F16K 7/16*  (2006.01)

(52) U.S. Cl.
CPC ..................... *F16K 7/16* (2013.01)

(58) Field of Classification Search
CPC ..... F16K 7/12; F16K 7/14; F16K 7/16; F16K 7/123; F16K 7/126; F16K 15/144
See application file for complete search history.

(56) References Cited

U.S. PATENT DOCUMENTS 4,029,296 A * 6/1977 Hartmann ............... F16K 7/126
251/331
5,031,875 A * 7/1991 Zimmerman ............ F16K 7/12
251/61.1

(Continued)

FOREIGN PATENT DOCUMENTS

JP  2007-321958 A  12/2007
JP  2011-214713 A  10/2011

OTHER PUBLICATIONS

International Search Report dated Mar. 3, 2020 issued in corresponding PCT/JP2020/000633 application (2 pages).

*Primary Examiner* — Hailey K. Do
(74) *Attorney, Agent, or Firm* — Millen, White, Zelano & Branigan, P.C.; William Nixon

(57) ABSTRACT

A diaphragm 30 includes a fixed portion 32 to be fixed to a body portion 10, and a flexible thin film portion 33 integrally connected to the fixed portion 32. The fixed portion 32 has a tubular press-fitting portion 34 to be press-fitted into a tubular sealing groove 15 formed on the body portion 10, and a diaphragm-side tapered surface 38 formed on an axis C side with respect to the press-fitting portion 34. In a state where the press-fitting portion 34 is press-fitted into the sealing groove 15, an inclination angle θ1 of the diaphragm-side tapered surface 38 relative to the axis C is smaller than an inclination angle θ2 of a body-side tapered surface 18 formed on the body portion 10 relative to the axis C, and an end portion 38a of the diaphragm-side tapered surface 38 is brought into contact with the body-side tapered surface 18.

4 Claims, 7 Drawing Sheets

(56) References Cited

U.S. PATENT DOCUMENTS

| | | | |
|---|---|---|---|
| 6,948,517 B2 * | 9/2005 | Fukano | F16K 7/16 251/63.5 |
| 2013/0043626 A1 | 2/2013 | Satori et al. | |
| 2015/0108386 A1 * | 4/2015 | Obara | F16K 7/12 251/331 |

* cited by examiner

DIAPHRAGM AND FLUID DEVICE

TECHNICAL FIELD

The present invention relates to a diaphragm and a fluid device.

BACKGROUND ART

As a fluid control valve for controlling the flow of a chemical solution that is handled in manufacturing processes in various technical fields such as semiconductors, liquid crystal devices, and organic EL devices, for example, the fluid control valve described in FIG. 8 of PATENT LITERATURE 1 is known. This fluid control valve controls the flow of a chemical solution from an input port of a body to an output port of the body by a diaphragm valve body coming into contact with or moving away from a valve seat provided between the input port and the output port. The diaphragm valve body inhibits the chemical solution in the body from leaking to the outside, by press-fitting a projection of a peripheral edge fixed portion thereof into a press-fitting groove formed on the outer side of an inner sealing portion of the body.

CITATION LIST

Patent Literature

PATENT LITERATURE 1: Japanese Laid-Open Patent Publication No. 2011-214713

SUMMARY OF INVENTION

Technical Problem

In the fluid control valve, a diaphragm-side tapered surface (valve-body-side tapered surface) formed on the peripheral edge fixed portion of the diaphragm valve body is brought into contact with a body-side tapered surface formed on the inner sealing portion of the body. Accordingly, the inner sealing portion is inhibited from falling down toward the axis side when the projection is press-fitted into the press-fitting groove. However, a gap is created between the valve-body-side tapered surface and the body-side tapered surface on the axis side with respect to the contact portion between both tapered surfaces, so that the chemical solution passing through the inside of the fluid control valve may enter the gap and remain therein. In this case, when the type of chemical solution passing through the inside of the fluid control valve is changed, the chemical solution remaining in the gap becomes a contamination source, which may cause a problem especially in a semiconductor manufacturing process which requires a clean environment.

The present invention has been made in view of such circumstances, and an object of the present invention is to provide a diaphragm and a fluid device that can inhibit a fluid from remaining between a diaphragm-side tapered surface and a body-side tapered surface.

Solution to Problem (1) A diaphragm according to the present invention is a diaphragm including a fixed portion to be fixed to a body, and a flexible thin film portion integrally connected to the fixed portion, one surface of the thin film portion coming into contact with a fluid in the body, wherein: the fixed portion has a tubular press-fitting portion to be press-fitted into a tubular sealing groove formed on the body, and a diaphragm-side tapered surface formed on an axis side with respect to the press-fitting portion and inclined such that the diaphragm-side tapered surface comes closer to the axis side while extending in a direction from a proximal end side of the press-fitting portion toward a projecting end side of the press-fitting portion; and, in a state where the press-fitting portion is press-fitted into the sealing groove, an inclination angle of the diaphragm-side tapered surface relative to the axis is smaller than an inclination angle of a body-side tapered surface formed on the body so as to be inclined in the same direction as the diaphragm-side tapered surface, relative to the axis, and an end portion on the axis side of one tapered surface out of the diaphragm-side tapered surface and the body-side tapered surface is brought into contact with the other tapered surface of the diaphragm-side tapered surface and the body-side tapered surface.

According to the present invention, in a state where the press-fitting portion of the diaphragm is press-fitted into the sealing groove of the body, the inclination angle of the diaphragm-side tapered surface is smaller than the inclination angle of the body-side tapered surface, and the end portion on the axis side of one tapered surface out of both tapered surfaces is brought into contact with the other tapered surface. Accordingly, on the axis side with respect to the contact portion between the diaphragm-side tapered surface and the body-side tapered surface, no gap is formed between both tapered surfaces, so that the fluid can be inhibited from remaining between the diaphragm-side tapered surface and the body-side tapered surface.

(2) Preferably, the one tapered surface is the diaphragm-side tapered surface, the other tapered surface is the body-side tapered surface, and an end portion on the axis side of the diaphragm-side tapered surface is brought into contact with a middle portion in the inclination direction of the body-side tapered surface.

In this case, the end portion on the axis side of the diaphragm-side tapered surface can be pressed against the body-side tapered surface in a stable state as compared to the case where the end portion on the axis side of the diaphragm-side tapered surface is brought into contact with an end portion in the inclination direction of the body-side tapered surface. Accordingly, the fixed portion can be reliably inhibited from falling down toward the axis side when the press-fitting portion is press-fitted into the sealing groove.

(3) Preferably, the fixed portion further has a liquid contact surface which is connected to the end portion of the diaphragm-side tapered surface on the axis side with respect to the diaphragm-side tapered surface and which comes into contact with the fluid, and the liquid contact surface is formed in a shape that inhibits the fluid from remaining between the body-side tapered surface and the liquid contact surface.

In this case, the fluid can be inhibited from remaining between the liquid contact surface and the body-side tapered surface near the end portion of the diaphragm-side tapered surface. Thus, the fluid can be further inhibited from remaining between the diaphragm-side tapered surface and the body-side tapered surface.

(4) A fluid device according to the present invention includes the diaphragm of any one of the above (1) to (3) and a body to which the fixed portion of the diaphragm is fixed.

According to the present invention, in a state where the press-fitting portion of the diaphragm is press-fitted into the sealing groove of the body, the inclination angle of the diaphragm-side tapered surface is smaller than the inclination angle of the body-side tapered surface, and the end portion on the axis side of one tapered surface out of both tapered surfaces is brought into contact with the other tapered surface. Accordingly, on the axis side with respect to the contact portion between the diaphragm-side tapered surface and the body-side tapered surface, no gap is formed between both tapered surfaces, so that the fluid can be inhibited from remaining between the diaphragm-side tapered surface and the body-side tapered surface.

Advantageous Effects of Invention

According to the present invention, the fluid can be inhibited from remaining between the diaphragm-side tapered surface and the body-side tapered surface.

DESCRIPTION OF EMBODIMENTS

First Embodiment

Next, preferred embodiments of the present invention will be described with reference to the accompanying drawings.

Figure 1:
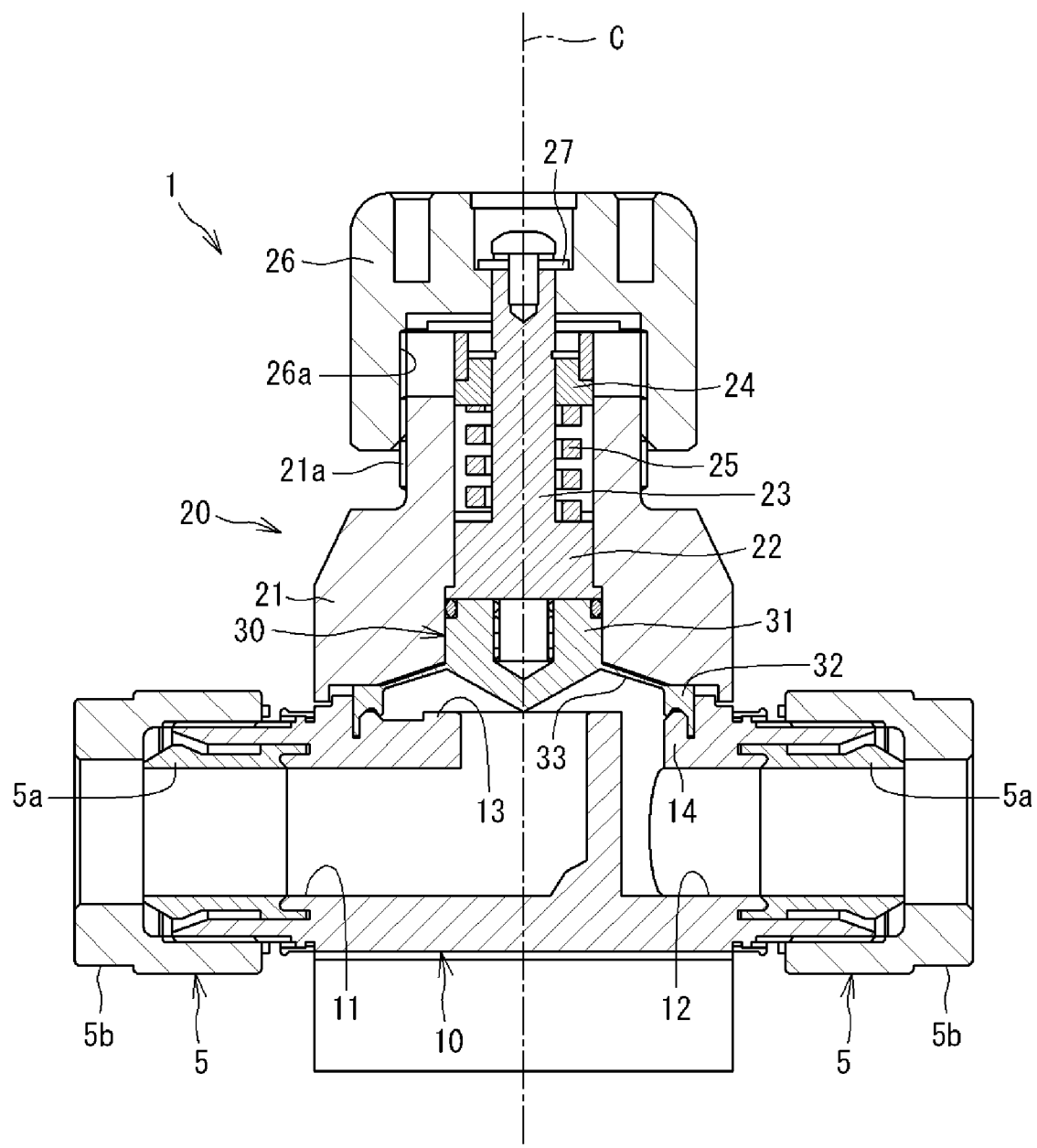
FIG. 1 is a cross-sectional view showing a fluid control valve including a diaphragm according to a first embodiment of the present invention.

FIG. 1 is a cross-sectional view showing a fluid control valve including a diaphragm according to a first embodiment of the present invention. In FIG. 1, a fluid control valve 1 is, for example, a fluid device that controls the flow of a chemical solution (fluid) in a piping path used in a semiconductor manufacturing apparatus. The fluid control valve 1 includes a body portion 10 and an actuator portion 20.

The body portion 10 has an input port 11 through which the chemical solution flows thereinto from the outside, an output port 12 through which the chemical solution flows out to the outside, and a valve seat 13 formed between the input port 11 and the output port 12. A pipe joint 5 having a sleeve 5a and a union nut 5b is provided at each of the input port 11 and the output port 12.

The actuator portion 20 includes a cylinder 21, a piston 22, a shaft 23, a lid member 24, a spring 25, a handle 26, and a diaphragm 30.

The cylinder 21 is formed, for example, in a cylindrical shape and is disposed in a state where an axis C thereof is directed in the up-down direction. The piston 22 is housed in the cylinder 21 such that the piston 22 reciprocates in the up-down direction in a state where the piston 22 is disposed coaxially with the cylinder 21. The fluid control valve 1 may be used in a state where the axis C of the cylinder 21 is directed in a direction other than the up-down direction.

A valve body portion 31 of the diaphragm 30 is fixed to the lower side of the piston 22. The diaphragm 30 is formed from, for example, a fluorine resin, and has the valve body portion 31 which comes into contact with or moves away from the valve seat 13 of the body portion 10, a fixed portion 32 which is fixed to the body portion 10, and a flexible thin film portion 33 which connects the valve body portion 31 and the fixed portion 32. A lower surface (one surface) 33a of the thin film portion 33 is formed as a liquid contact surface that comes into contact with the chemical solution (see FIG. 2). The fixed portion 32 will be described in detail later.

On the upper side of the piston 22, the shaft 23 is integrally formed so as to be disposed coaxially with the piston 22 and extend upward. An upper end portion of the shaft 23 penetrates the lid member 24, which is fixed to an upper end portion of the cylinder 21, with play and protrudes above the cylinder 21. The spring 25 is inserted onto the shaft 23 and disposed between the lid member 24 and the piston 22 in the cylinder 21. Accordingly, the spring 25 presses and biases the piston 22 and the shaft 23 downward.

An external thread portion 21a is formed on the outer periphery of the upper end portion of the cylinder 21, and an internal thread portion 26a formed on the inner periphery of the handle 26 is screwed to the external thread portion 21a. The upper end portion of the shaft 23 penetrates a center portion of the handle 26 with play. A flange member 27 is fixed to the portion of the shaft 23 that protrudes upward from the handle 26. Accordingly, when the handle 26 is rotated and moved upward relative to the cylinder 21, the shaft 23 is lifted by the handle 26 coming into contact with the lower surface of the flange member 27.

Owing to the above configuration, when the handle 26 is rotated in a direction in which the handle 26 is loosened, the handle 26 moves upward relative to the cylinder 21, whereby the shaft 23 is lifted upward together with the handle 26. Accordingly, the piston 22 moves upward against the biasing force of the spring 25, so that the valve body portion 31 of the diaphragm 30 moves upward away from the valve seat 13. As a result, the flow rate of the chemical solution flowing from the input port 11 toward the output port 12 in the body portion 10 is increased.

On the other hand, when the handle 26 is rotated in a direction in which the handle 26 is tightened, the handle 26 moves downward relative to the cylinder 21, whereby the force of lifting the piston 22 by the handle 26 is released. Accordingly, the piston 22 moves downward due to the biasing force of the spring 25, and the valve body portion 31 of the diaphragm 30 moves downward until the valve body portion 31 comes into contact with the valve seat 13. As a result, the flow rate of the chemical solution flowing from the input port 11 toward the output port 12 in the body portion 10 is decreased.

Figure 2:
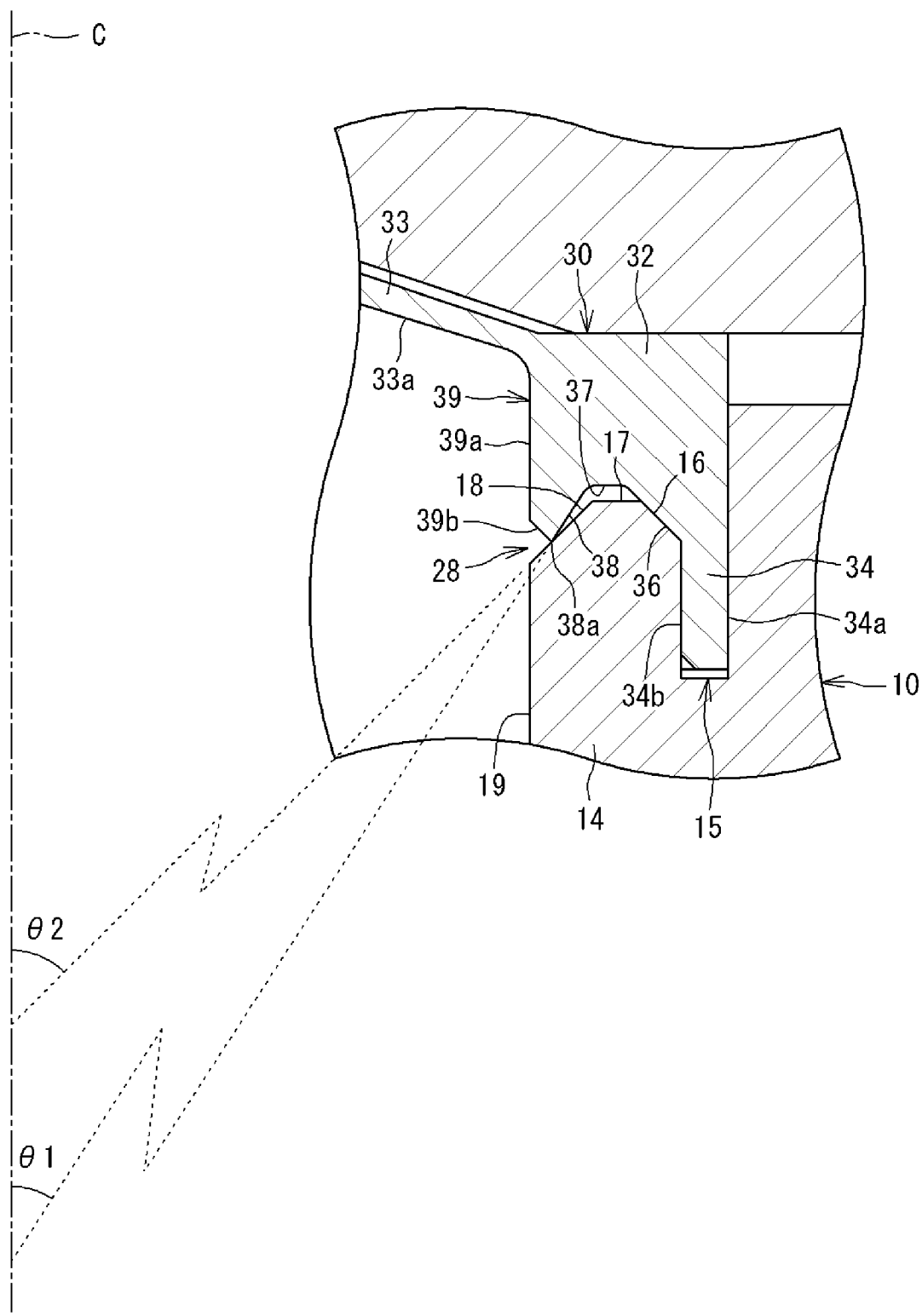
FIG. 2 is an enlarged cross-sectional view showing a structure for fixing a fixed portion of the diaphragm and a body.

FIG. 2 is an enlarged cross-sectional view showing a structure for fixing the fixed portion 32 of the diaphragm 30 and the body portion 10. In FIG. 2, the body portion 10 has a fixation portion 14 to which the diaphragm 30 is fixed. A sealing groove 15 is formed on the fixation portion 14 so as to be open upward. The sealing groove 15 is formed, for example, in a cylindrical shape, and the axis thereof is located on the axis C of the cylinder 21.

The fixed portion 32 of the diaphragm 30 has a press-fitting portion 34 which projects downward and is press-fitted into the sealing groove 15 of the fixation portion 14.

The press-fitting portion 34 is formed, for example, in a cylindrical shape, and the axis thereof is located on the axis C of the cylinder 21. An outer peripheral surface 34*a* and an inner peripheral surface 34*b* of the press-fitting portion 34 are formed as sealing surfaces that are in close contact with the outer peripheral surface and the inner peripheral surface of the sealing groove 15, respectively. Thus, the chemical solution in the body portion 10 is inhibited from leaking from between the fixation portion 14 and the fixed portion 32 to the outside.

On the fixation portion 14 of the body portion 10, a first body-side tapered surface 16, a body-side flat surface 17, a second body-side tapered surface (body-side tapered surface) 18, and a body-side liquid contact surface 19 are continuously formed in this order from the opening of the sealing groove 15 toward the axis C side. It is sufficient that at least the second body-side tapered surface 18 and the body-side liquid contact surface 19 are formed on the fixation portion 14.

The first body-side tapered surface 16 is formed so as to be inclined such that the first body-side tapered surface 16 comes closer to the axis C side while extending in the direction from the bottom of the sealing groove 15 toward the opening of the sealing groove 15 (upward direction in FIG. 2). The body-side flat surface 17 is formed so as to be perpendicular to the axis C. The second body-side tapered surface 18 is formed so as to be inclined such that the second body-side tapered surface 18 comes closer to the axis C side while extending in the direction from the opening of the sealing groove 15 toward the bottom of the sealing groove 15 (downward direction in FIG. 2). The body-side liquid contact surface 19 is a surface that comes into contact with the chemical solution in the body portion 10, and is formed so as to be parallel to the axis C.

On the fixed portion 32 of the diaphragm 30, a first diaphragm-side tapered surface 36, a diaphragm-side flat surface 37, a second diaphragm-side tapered surface (diaphragm-side tapered surface) 38, and a diaphragm-side liquid contact surface (liquid contact surface) 39 are continuously formed in this order from the inner peripheral surface 34*b* of the press-fitting portion 34 toward the axis C side. It is sufficient that at least the second diaphragm-side tapered surface 38 and the diaphragm-side liquid contact surface 39 are formed on the fixed portion 32.

The first diaphragm-side tapered surface 36 is formed so as to be inclined such that the first diaphragm-side tapered surface 36 comes closer to the axis C side while extending in the direction from the projecting end side of the press-fitting portion 34 toward the proximal end side of the press-fitting portion 34 (upward direction in FIG. 2). An inclination angle of the first diaphragm-side tapered surface 36 relative to the axis C is made equal to an inclination angle of the first body-side tapered surface 16 relative to the axis C, and a large part of the first diaphragm-side tapered surface 36 is in surface contact with the first body-side tapered surface 16. The diaphragm-side flat surface 37 is formed so as to be perpendicular to the axis C and faces the body-side flat surface 17 with a gap therebetween.

The second diaphragm-side tapered surface 38 is formed so as to be inclined such that the second diaphragm-side tapered surface 38 comes closer to the axis C side while extending in the direction from the proximal end side of the press-fitting portion 34 toward the projecting end side of the press-fitting portion 34 (downward direction in FIG. 2). An inclination angle $\theta1$ of the second diaphragm-side tapered surface 38 relative to the axis C is smaller than an inclination angle $\theta2$ of the second body-side tapered surface 18 relative to the axis C. In addition, the length in the inclination direction, from the diaphragm-side flat surface 37 to the diaphragm-side liquid contact surface 39, of the second diaphragm-side tapered surface 38 is shorter than the length in the inclination direction, from the body-side flat surface 17 to the body-side liquid contact surface 19, of the second body-side tapered surface 18.

Accordingly, an end portion 38*a* on the axis C side of the second diaphragm-side tapered surface 38 is brought into contact with a middle portion in the inclination direction of the second body-side tapered surface 18 so as to be pressed against this middle portion, so that the fixed portion 32 can be inhibited from falling down toward the axis C side when the press-fitting portion 34 is press-fitted into the sealing groove 15.

Here, the "end portion" on the axis C side of the second diaphragm-side tapered surface 38 means to include not only the end on the axis C side of the second diaphragm-side tapered surface 38 but also a portion near the end of the second diaphragm-side tapered surface 38 in a range where the advantageous effects of the present invention are achieved.

The diaphragm-side liquid contact surface 39 is a surface that comes into contact with the chemical solution in the body portion 10, and is formed in a shape that inhibits the chemical solution from remaining between the second body-side tapered surface 18 and the diaphragm-side liquid contact surface 39. Specifically, the diaphragm-side liquid contact surface 39 of the present embodiment has a liquid contact main surface 39*a* formed so as to be parallel to the axis C, and a chamfered surface 39*b* inclined relative to the liquid contact main surface 39*a*.

The liquid contact main surface 39*a* is located so as to be flush with the body-side liquid contact surface 19, the upper end of the liquid contact main surface 39*a* is connected to the lower surface 33*a* of the thin film portion 33, and the lower end of the liquid contact main surface 39*a* is connected to the upper end of the chamfered surface 39*b*. The chamfered surface 39*b* is formed so as to be perpendicular to the second body-side tapered surface 18, and the lower end of the chamfered surface 39*b* is connected to the end portion 38*a* of the second diaphragm-side tapered surface 38.

Accordingly, a recess 28 defined by the chamfered surface 39*b* of the diaphragm-side liquid contact surface 39 and the second body-side tapered surface 18 is formed with a V-shaped cross-section so as to be widened on the opening side thereof. Therefore, even when the chemical solution in the body portion 10 enters the recess 28, the chemical solution easily flows out through the opening of the recess 28, so that the chemical solution can be inhibited from remaining in the recess 28.

As described above, in the fluid control valve 1 according to the present embodiment, in a state where the press-fitting portion 34 is press-fitted into the sealing groove 15, the inclination angle $\theta1$ of the second diaphragm-side tapered surface 38 is smaller than the inclination angle $\theta2$ of the second body-side tapered surface 18, and the end portion 38*a* of the second diaphragm-side tapered surface 38 is brought into contact with the second body-side tapered surface 18. Accordingly, on the axis C side with respect to the contact portion between the second diaphragm-side tapered surface 38 and the second body-side tapered surface 18, no gap is formed between both tapered surfaces 38 and 18, so that the fluid can be inhibited from remaining between the second diaphragm-side tapered surface 38 and the second body-side tapered surface 18.

Moreover, the end portion 38a on the axis C side of the second diaphragm-side tapered surface 38 is brought into contact with the middle portion in the inclination direction of the second body-side tapered surface 18. Therefore, the end portion 38a of the second diaphragm-side tapered surface 38 can be pressed against the second body-side tapered surface 18 in a stable state as compared to the case where the end portion 38a of the second diaphragm-side tapered surface 38 is brought into contact with an end portion in the inclination direction of the body-side tapered surface 18 (see FIG. 5). Accordingly, the fixed portion 32 can be reliably inhibited from falling down toward the axis C side when the press-fitting portion 34 is press-fitted into the sealing groove 15.

Moreover, the diaphragm-side liquid contact surface 39 is formed in a shape that inhibits the fluid from remaining between the second body-side tapered surface 18 and the diaphragm-side liquid contact surface 39. Accordingly, the chemical solution can be inhibited from remaining between the diaphragm-side liquid contact surface 39 (chamfered surface 39b) and the second body-side tapered surface 18 near the end portion 38a of the second diaphragm-side tapered surface 38. As a result, the chemical solution can be further inhibited from remaining between the second diaphragm-side tapered surface 38 and the second body-side tapered surface 18.

Figure 3:
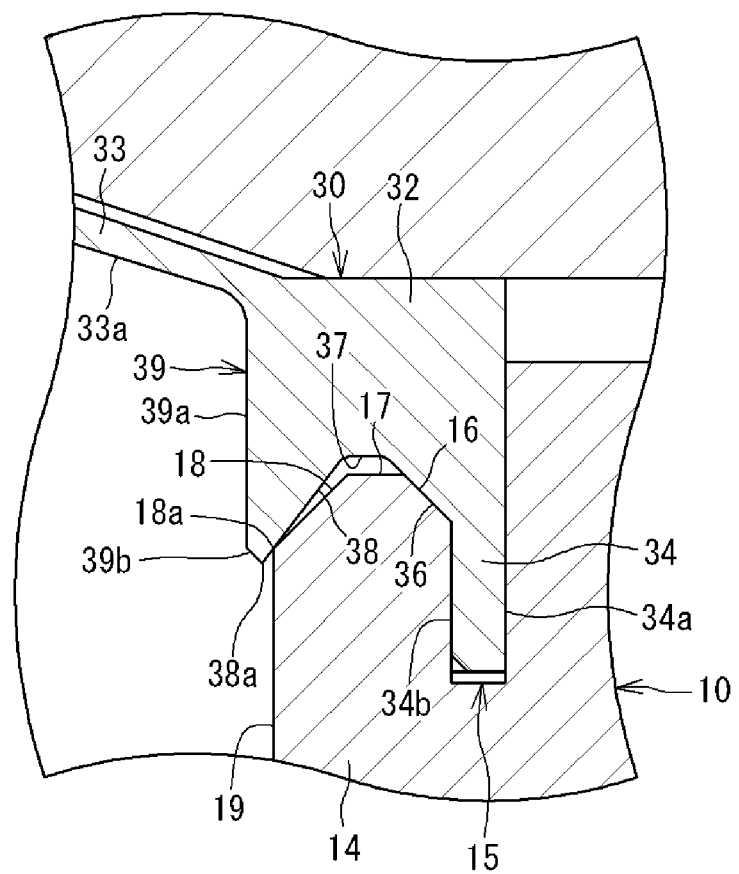
FIG. 3 is an enlarged cross-sectional view showing a modification of the diaphragm.

FIG. 3 is an enlarged cross-sectional view showing a modification of the diaphragm 30. As shown in FIG. 3, in the diaphragm 30 of the present modification, the length in the inclination direction, from the diaphragm-side flat surface 37 to the diaphragm-side liquid contact surface 39, of the second diaphragm-side tapered surface 38 is longer than the length in the inclination direction, from the body-side flat surface 17 to the body-side liquid contact surface 19, of the second body-side tapered surface 18. Therefore, in the present modification, a portion on the upper side (press-fitting portion 34 side) with respect to the end portion 38a of the second diaphragm-side tapered surface 38 is brought into contact with an end portion 18a on the axis C side of the second body-side tapered surface 18 so as to be pressed against the end portion 18a.

Figure 4:
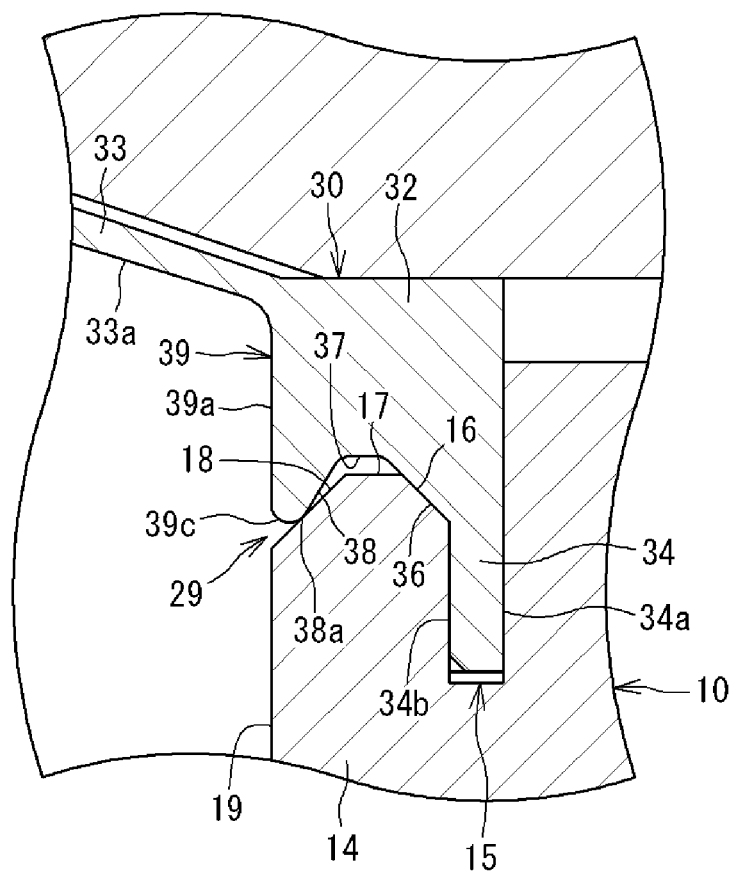
FIG. 4 is an enlarged cross-sectional view showing another modification of the diaphragm.

FIG. 4 is an enlarged cross-sectional view showing another modification of the diaphragm 30. As shown in FIG. 4, in the diaphragm 30 of the present modification, the diaphragm-side liquid contact surface 39 has a liquid contact main surface 39a which is formed so as to be parallel to the axis C, and an R chamfered surface 39c which connects the liquid contact main surface 39a and the end portion 38a of the second diaphragm-side tapered surface 38. A recess 29 is defined by the R chamfered surface 39c of the diaphragm-side liquid contact surface 39 and the second body-side tapered surface 18. In the present modification, similar to the above embodiment, the end portion 38a of the second diaphragm-side tapered surface 38 is brought into contact with the middle portion in the inclination direction of the second body-side tapered surface 18 so as to be pressed against the middle portion.

Figure 5:
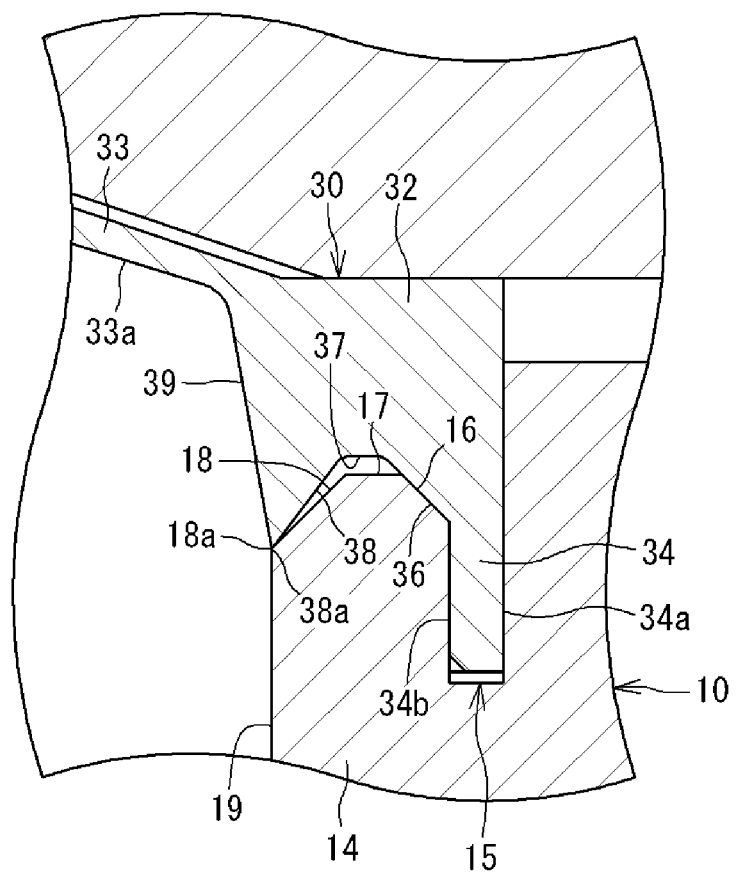
FIG. 5 is an enlarged cross-sectional view showing still another modification of the diaphragm.

FIG. 5 is an enlarged cross-sectional view showing still another modification of the diaphragm 30. As shown in FIG. 5, in the diaphragm 30 of the present modification, the entirety of the diaphragm-side liquid contact surface 39 is formed as an inclined surface that is inclined to the axis C side while extending from the end portion 38a of the second diaphragm-side tapered surface 38 toward the lower surface 33a of the thin film portion 33. The end portion 38a of the second diaphragm-side tapered surface 38 is brought into contact with the end portion 18a on the axis C side of the second body-side tapered surface 18 so as to be pressed against the end portion 18a. Therefore, in the present modification, no recess is formed between the diaphragm-side liquid contact surface 39 and the second body-side tapered surface 18, so that the chemical solution can be further inhibited from remaining between the diaphragm-side liquid contact surface 39 and the body-side tapered surface 18 as compared to that in the above embodiment.

Second Embodiment

Figure 6:
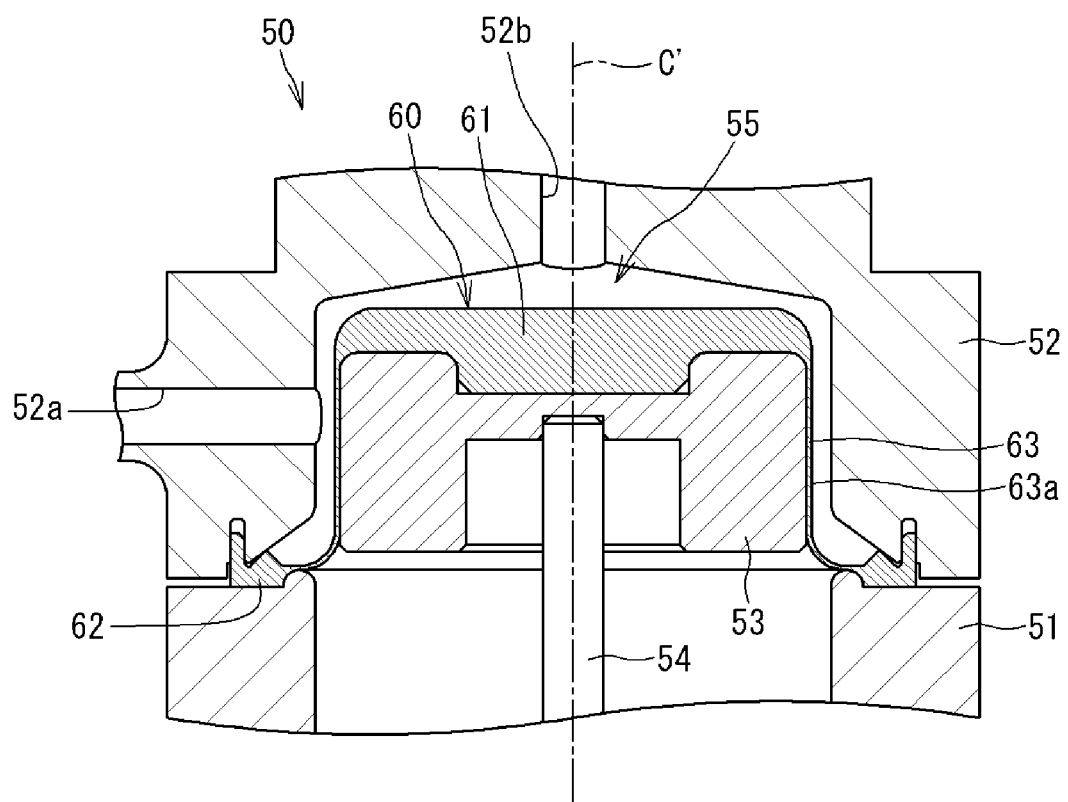
FIG. 6 is a cross-sectional view showing a diaphragm pump including a diaphragm according to a second embodiment of the present invention.

FIG. 6 is a cross-sectional view showing a diaphragm pump including a diaphragm according to a second embodiment of the present invention. In FIG. 6, a diaphragm pump 50 is, for example, a fluid device that supplies a chemical solution (fluid) in a semiconductor manufacturing apparatus. The diaphragm pump 50 includes a cylinder 51, a body portion 52, a piston 53, a shaft 54, and a diaphragm 60.

The cylinder 51 is formed, for example, in a cylindrical shape and is disposed in a state where an axis C' thereof is directed in the up-down direction. The diaphragm pump 50 may be used in a state where the axis C' of the cylinder 51 is directed in a direction other than the up-down direction.

The body portion 52 is formed in a cylindrical shape with a lid and is disposed coaxially with the axis C'. The body portion 52 is mounted on the upper side in the axial direction of the cylinder 51 so as to close the opening of the cylinder 51. The body portion 52 has substantially the same inner diameter as the cylinder 51, and, together with the cylinder 51, forms a housing space in which the piston 53 can be housed. In the body portion 52, a suction port 52a connected to a chemical solution tank (not shown) for storing the chemical solution (fluid) and a discharge port 52b connected to a chemical solution supply portion (not shown) such as an injection nozzle for applying the chemical solution are formed.

The piston 53 is disposed coaxially with the axis C'. An upper end portion of the shaft 54 is fitted and fixed to the lower side of a center portion of the piston 53. A drive device (not shown) for reciprocating the piston 53 in the axial direction is connected to a lower end portion of the shaft 54.

The diaphragm 60 is formed from, for example, a fluorine resin, and is housed in the body portion 52. The diaphragm 60 has a circular movable portion 61 which is mounted on the upper side of the piston 53, an annular fixed portion 62 which is fixed to the body portion 52, and a flexible thin film portion 63 which connects the movable portion 61 and the fixed portion 62. An outer surface (one surface) 63a of the thin film portion 63 is formed as a liquid contact surface that comes into contact with the chemical solution.

In the cylinder 51 and the body portion 52, a pump chamber 55 is defined by the diaphragm 60. In the diaphragm 60, the movable portion 61 reciprocates in the axial direction together with the piston 53 relative to the fixed portion 62, which is fixed in position on the cylinder 51 side, and the thin film portion 63 makes a bending motion, whereby the internal volume of the pump chamber 55 is changed. When the volume of the pump chamber 55 is changed as described above, the chemical solution is sucked through the suction port 52a into the pump chamber 55 and discharged through the discharge port 52b to the outside.

Figure 7:
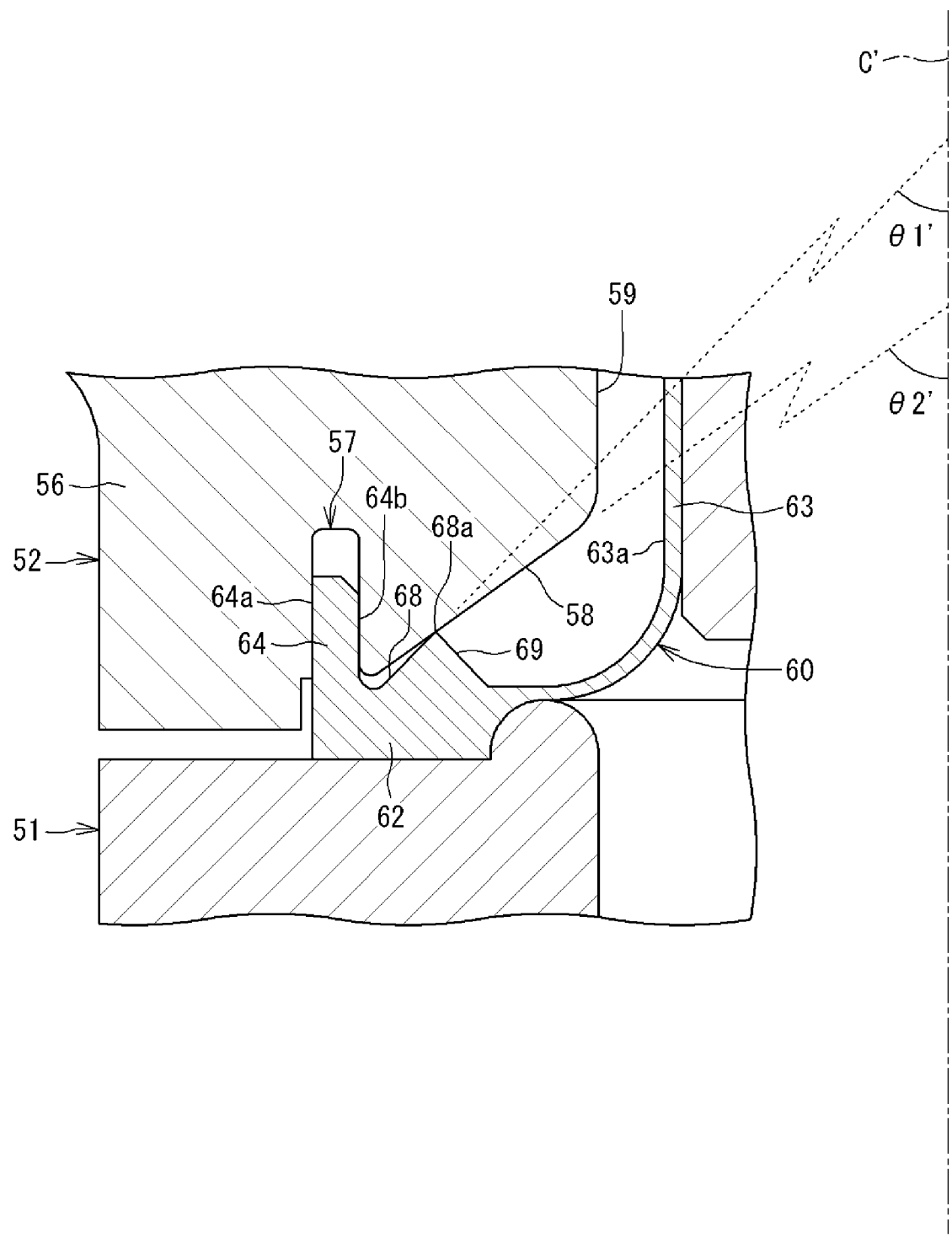
FIG. 7 is an enlarged cross-sectional view showing a structure for fixing a fixed portion of the diaphragm and a body in FIG. 6.

FIG. 7 is an enlarged cross-sectional view showing a structure for fixing the fixed portion 62 of the diaphragm 60 and the body portion 52. In FIG. 7, the body portion 52 has a fixation portion 56 to which the diaphragm 60 is fixed. A sealing groove 57 is formed on the fixation portion 56 so as to be open downward. The sealing groove 57 is formed, for example, in a cylindrical shape, and the axis thereof is located on the axis C' of the cylinder 51.

The fixed portion 62 of the diaphragm 60 has a press-fitting portion 64 which projects upward and is press-fitted into the sealing groove 57 of the fixation portion 56. The press-fitting portion 64 is formed, for example, in a cylindrical shape, and the axis thereof is located on the axis C' of the cylinder 51. An outer peripheral surface 64a and an inner peripheral surface 64b of the press-fitting portion 64 are formed as sealing surfaces that are in close contact with the outer peripheral surface and the inner peripheral surface of the sealing groove 57, respectively. Thus, the chemical solution in the body portion 52 is inhibited from leaking from between the fixation portion 56 and the fixed portion 62 to the outside.

On the fixation portion 56 of the body portion 52, a body-side tapered surface 58 and a body-side liquid contact surface 59 are continuously formed in this order from the opening of the sealing groove 57 toward the axis C' side.

The body-side tapered surface 58 is formed so as to be inclined such that the body-side tapered surface 58 comes closer to the axis C' side while extending in the direction from the opening of the sealing groove 57 toward the bottom of the sealing groove 57 (upward direction in FIG. 7). The body-side liquid contact surface 59 is a surface that comes into contact with the chemical solution in the body portion 52, and is formed so as to be parallel to the axis C'.

On the fixed portion 62 of the diaphragm 60, a diaphragm-side tapered surface 68 and a diaphragm-side liquid contact surface 69 are continuously formed in this order from the inner peripheral surface 64b of the press-fitting portion 64 toward the axis C' side.

The diaphragm-side tapered surface 68 is formed so as to be inclined such that the diaphragm-side tapered surface 68 comes closer to the axis C' side while extending in the direction from the proximal end side of the press-fitting portion 64 toward the projecting end side of the press-fitting portion 64 (upward direction in FIG. 7).

An inclination angle $\theta1'$ of the diaphragm-side tapered surface 68 relative to the axis C' is smaller than an inclination angle $\theta2'$ of the body-side tapered surface 58 relative to the axis C'. In addition, the length in the inclination direction, from the proximal end of the press-fitting portion 64 to the diaphragm-side liquid contact surface 69, of the diaphragm-side tapered surface 68 is shorter than the length in the inclination direction, from the opening of the sealing groove 57 to the body-side liquid contact surface 59, of the body-side tapered surface 58.

Accordingly, an end portion 68a on the axis C' side of the diaphragm-side tapered surface 68 is brought into contact with a middle portion in the inclination direction of the body-side tapered surface 58 so as to be pressed against this middle portion, so that the fixed portion 62 can be inhibited from falling down toward the axis C' side when the press-fitting portion 64 is press-fitted into the sealing groove 57.

Here, the "end portion" on the axis C' side of the diaphragm-side tapered surface 68 means to include not only the end on the axis C' side of the diaphragm-side tapered surface 68 but also a portion near the end of the diaphragm-side tapered surface 68 in a range where the advantageous effects of the present invention are achieved.

The diaphragm-side liquid contact surface 69 is a surface that comes into contact with the chemical solution in the body portion 52, and is formed so as to be inclined such that the diaphragm-side liquid contact surface 69 comes closer to the axis C' side while extending in the direction from the projecting end side of the press-fitting portion 64 toward the proximal end side of the press-fitting portion 64 (downward direction in FIG. 7). The shape of the diaphragm-side liquid contact surface 69 is not limited to the shape in the present embodiment, and may be formed, for example, so as to be parallel to the axis C'.

As described above, in the diaphragm pump 50 according to the present embodiment, in a state where the press-fitting portion 64 is press-fitted into the sealing groove 57, the inclination angle $\theta1'$ of the diaphragm-side tapered surface 68 is smaller than the inclination angle $\theta2'$ of the body-side tapered surface 58, and the end portion 68a of the diaphragm-side tapered surface 68 is brought into contact with the body-side tapered surface 58. Accordingly, the chemical solution can be inhibited from remaining between the diaphragm-side tapered surface 68 and the body-side tapered surface 58 on the press-fitting portion 64 side with respect to the end portion 68a of the diaphragm-side tapered surface 68.

Moreover, the end portion 68a on the axis C' side of the diaphragm-side tapered surface 68 is brought into contact with the middle portion in the inclination direction of the body-side tapered surface 58. Therefore, the end portion 68a of the diaphragm-side tapered surface 68 can be pressed against the body-side tapered surface 58 in a stable state as compared to the case where the end portion 68a of the diaphragm-side tapered surface 68 is brought into contact with an end portion in the inclination direction of the body-side tapered surface 58. Accordingly, the fixed portion 62 can be reliably inhibited from falling down toward the axis C' side when the press-fitting portion 64 is press-fitted into the sealing groove 57.

[Others]

The case where the diaphragm according to each of the above embodiments is used for a semiconductor manufacturing apparatus has been described, but the flow passage joint structure may be used in the liquid crystal/organic EL field, the medical/pharmaceutical field, etc.

The embodiments disclosed herein are merely illustrative in all aspects and should be considered not restrictive. The scope of the present invention is defined by the scope of the claims rather than the meaning described above, and is intended to include meaning equivalent to the scope of the claims and all modifications within the scope.

REFERENCE SIGNS LIST 1 fluid control valve (fluid device)
10 body portion (body)
15 sealing groove
18 second body-side tapered surface (body-side tapered surface)
30 diaphragm
32 fixed portion
33 thin film portion
33a lower surface (one surface)
34 press-fitting portion
38 second diaphragm-side tapered surface (diaphragm-side tapered surface)
38a end portion
39 diaphragm-side liquid contact surface (liquid contact surface)
50 diaphragm pump (fluid device)
52 body portion (body)
57 sealing groove
58 body-side tapered surface
60 diaphragm
62 fixed portion 63 thin film portion
63a outer surface (one surface)
64 press-fitting portion
68 diaphragm-side tapered surface
68a end portion
C axis
C' axis
θ1 inclination angle
θ1' inclination angle
θ2 inclination angle
θ2' inclination angle

The invention claimed is:

1. A diaphragm comprising a fixed portion to be fixed to a body, and a flexible thin film portion integrally connected to the fixed portion, one surface of the thin film portion coming into contact with a fluid in the body, wherein
the fixed portion has
a tubular press-fitting portion to be press-fitted into a tubular sealing groove formed on the body, and
a diaphragm-side tapered surface formed on an axis side with respect to the tubular press-fitting portion and inclined such that the diaphragm-side tapered surface comes closer to the axis side while extending in a direction from a proximal end side of the tubular press-fitting portion toward a projecting end side of the tubular press-fitting portion, and
in a state where the tubular press-fitting portion is press-fitted into the tubular sealing groove, an inclination angle of the diaphragm-side tapered surface relative to an axis is smaller than an inclination angle of a body-side tapered surface formed on the body so as to be inclined in the same direction as the diaphragm-side tapered surface, relative to the axis, and an end portion on the axis side of one tapered surface out of the diaphragm-side tapered surface and the body-side tapered surface is brought into contact with the other tapered surface of the diaphragm-side tapered surface and the body-side tapered surface.

2. The diaphragm according to claim 1, wherein
the one tapered surface is the diaphragm-side tapered surface, and the other tapered surface is the body-side tapered surface, and
the end portion on the axis side of the diaphragm-side tapered surface is brought into contact with a middle portion in an inclination direction of the body-side tapered surface.

3. The diaphragm according to claim 2, wherein
the fixed portion further has a liquid contact surface which is connected to the end portion of the diaphragm-side tapered surface on the axis side with respect to the diaphragm-side tapered surface and which comes into contact with the fluid, and
the liquid contact surface is formed in a shape that inhibits the fluid from remaining between the body-side tapered surface and the liquid contact surface.

4. A fluid device comprising:
the diaphragm according to claim 1; and
the body to which the fixed portion of the diaphragm is fixed.

* * * * *